Feb. 25, 1941. S. B. WINN 2,232,755
TRAILER BRAKE OPERATING MECHANISM
Original Filed Jan. 3, 1938 5 Sheets-Sheet 1
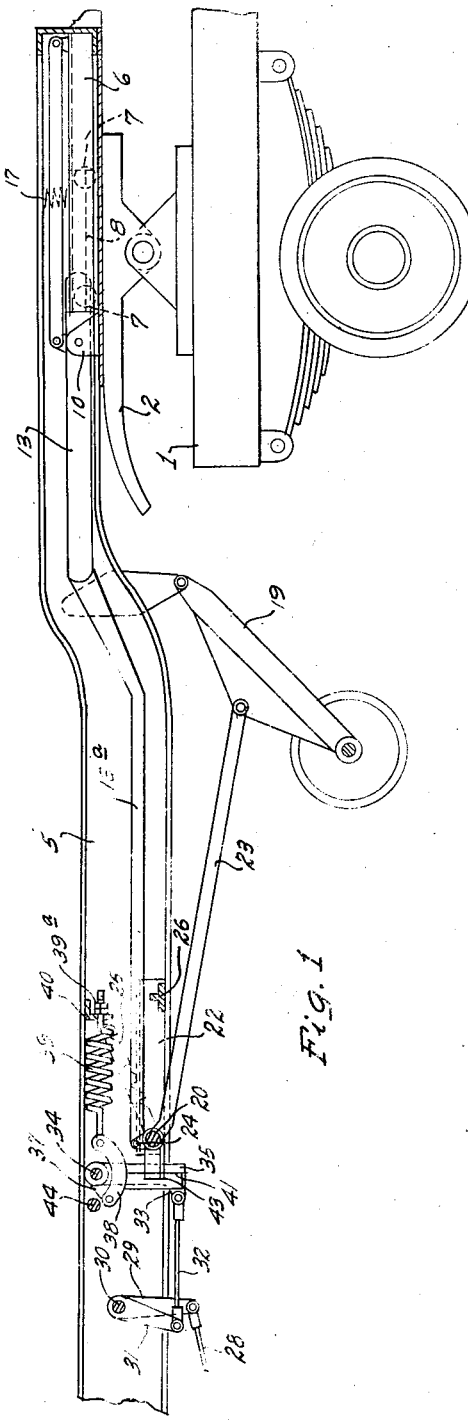
Fig. 1
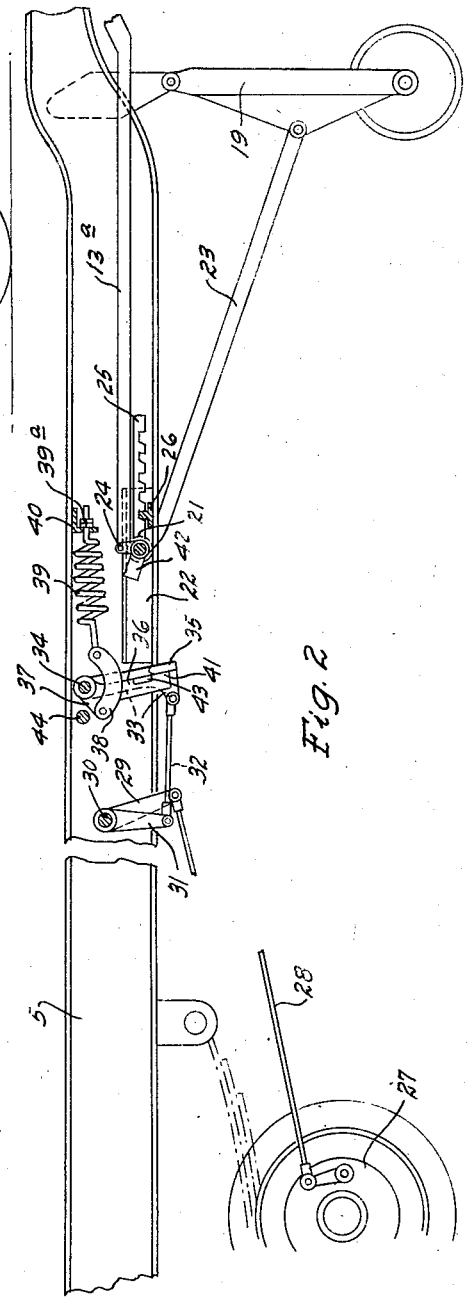
Fig. 2
Inventor
SIDNEY B. WINN.
By 
Attorneys

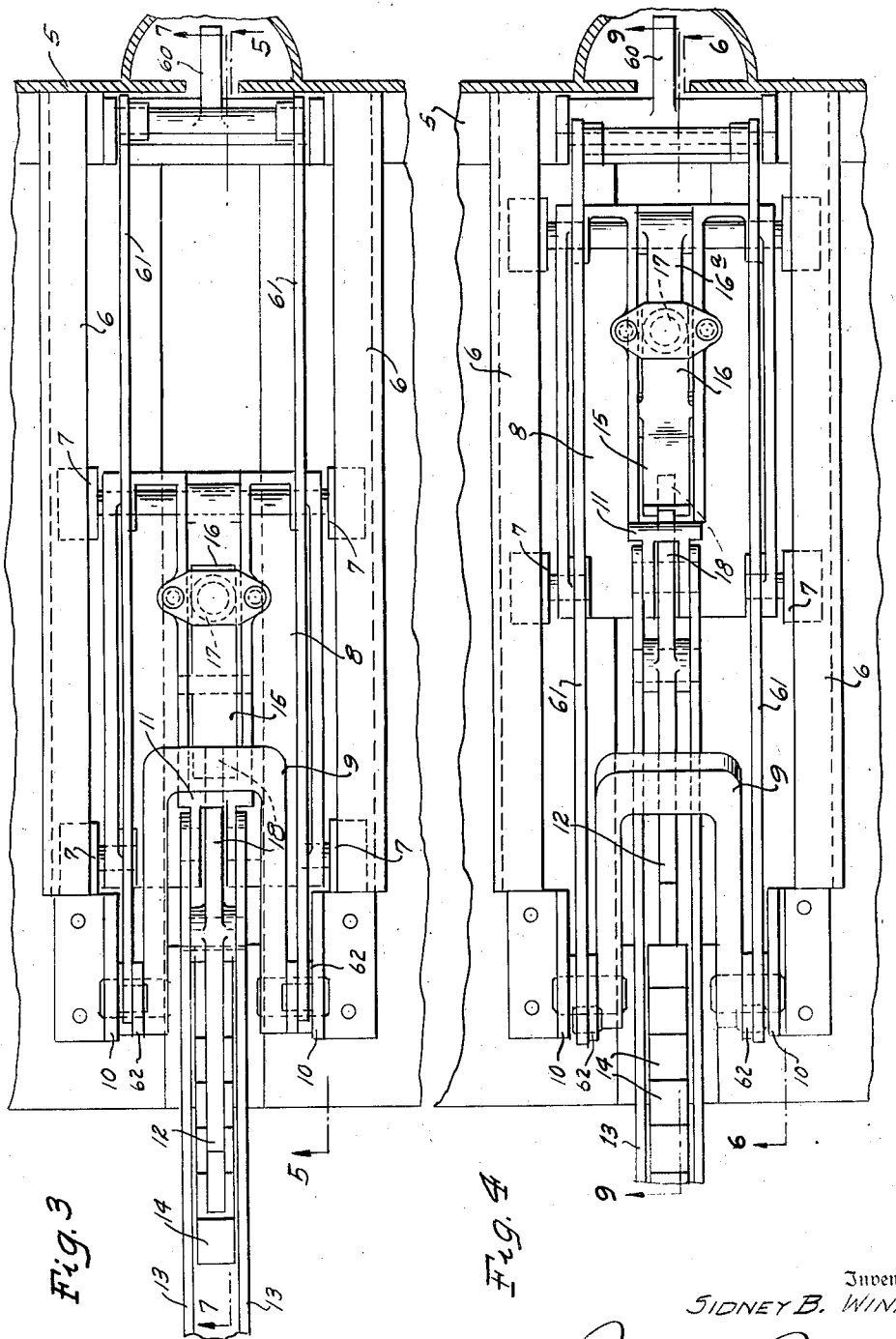

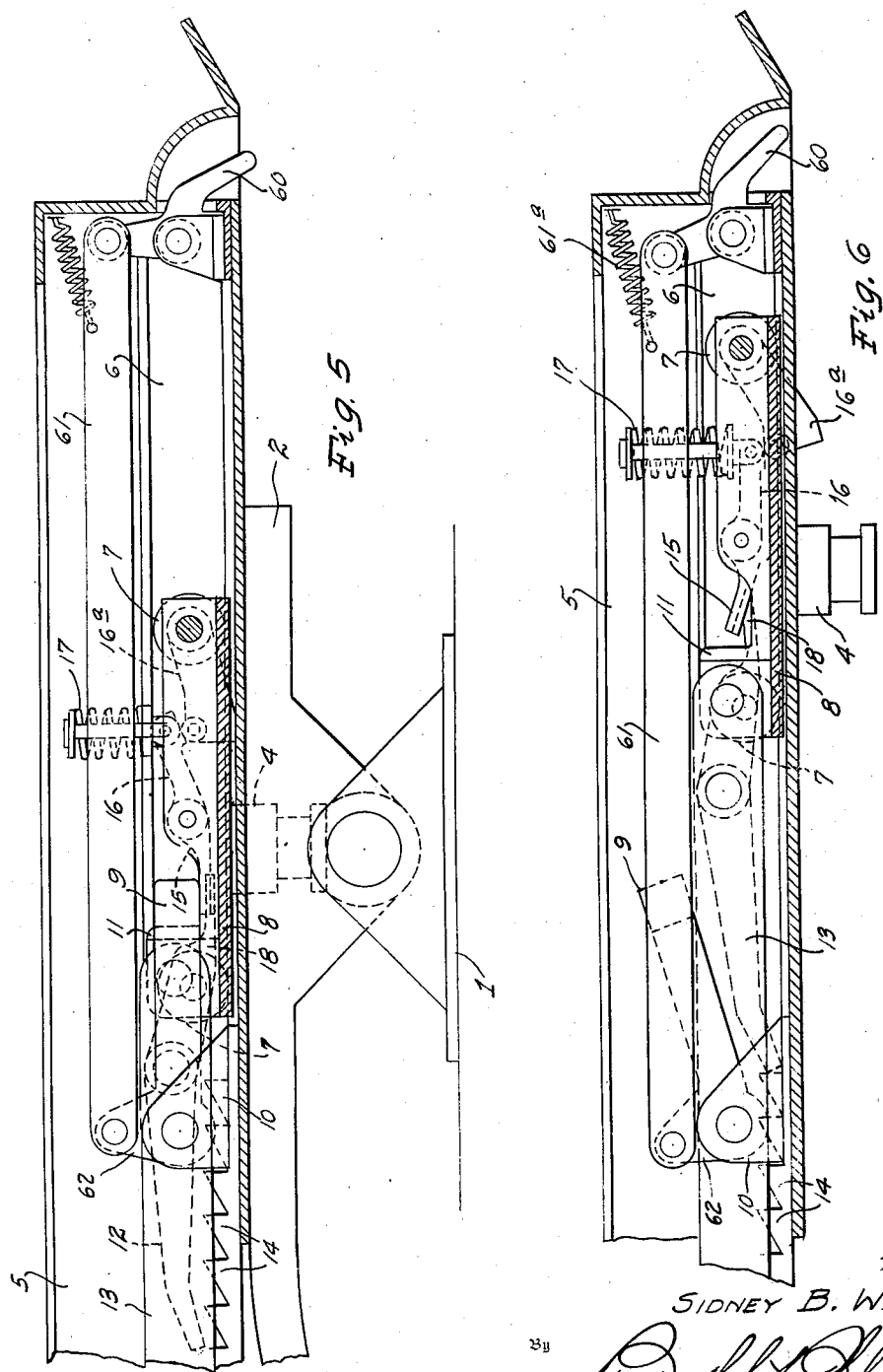

Feb. 25, 1941.  S. B. WINN  2,232,755
TRAILER BRAKE OPERATING MECHANISM
Original Filed Jan. 3, 1938  5 Sheets-Sheet 4
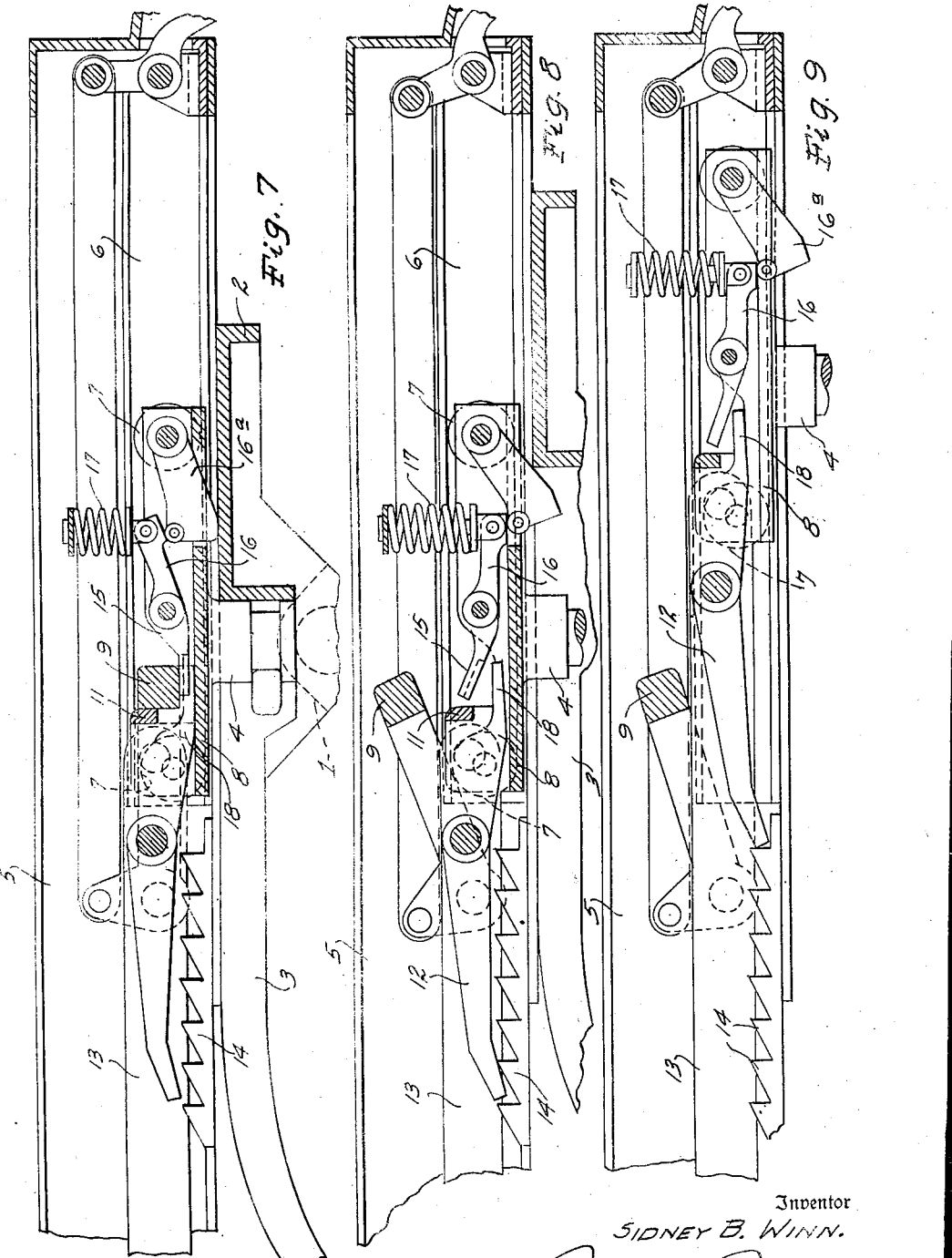
Inventor
SIDNEY B. WINN.
By
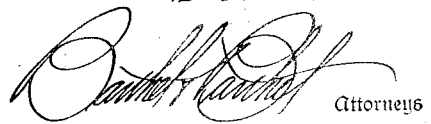
Attorneys Inventor
SIDNEY B. WINN.

Patented Feb. 25, 1941

2,232,755

UNITED STATES PATENT OFFICE 2,232,755

TRAILER BRAKE OPERATING MECHANISM

Sidney B. Winn, Lapeer, Mich.

Original application January 3, 1938, Serial No. 183,072. Divided and this application June 5, 1939, Serial No. 277,343

10 Claims. (Cl. 188—3)

This invention relates generally to tractor-trailer vehicles and more particularly to brake applying mechanism therefor.

This application is a division of my co-pending application entitled Tractor trailer coupling mechanism, filed January 3, 1938, Serial No. 183,072.

It is an object of the present invention to provide new and improved brake operating mechanism for trailers having props arranged to be raised and lowered.

Another object of the invention is to provide for a trailer of the above mentioned character brake operating mechanism which is automatically operable upon uncoupling of such trailers from tractors.

Another object of the invention is to provide for trailers, new and improved brake operating mechanism including manually releasing, automatically actuated holding mechanism for positively holding the brakes applied.

Other objects of the invention will become apparent from the following description taken in connection with the accompanying drawings, in which—

Figure 1 is a fragmental side view of a coupled tractor and trailer, the trailer being shown in vertical section;

Fig. 2 is a fragmental view of the trailer;

Figs. 3 and 4 are fragmental plan views, illustrating coupled and uncoupled positions respectively;

Fig. 5 is a section taken on the line 5—5 of Fig. 3;

Fig. 6 is a section taken on the line 6—6 of Fig. 4;

Fig. 7 is a section taken on the line 7—7 of Fig. 3;

Fig. 8 is a section similar to Fig. 5, illustrating the lock released, prior to movement of the king pin;

Fig. 9 is a section taken on the line 9—9 of Fig. 4;

Like characters of reference are employed throughout to designate corresponding parts.

Figure 10:
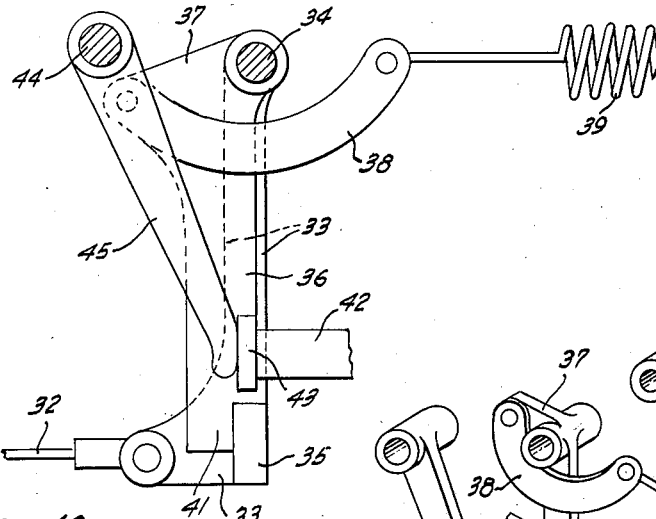
Fig. 10 is a fragmental section, illustrating the brake actuating levers.
Figure 11:
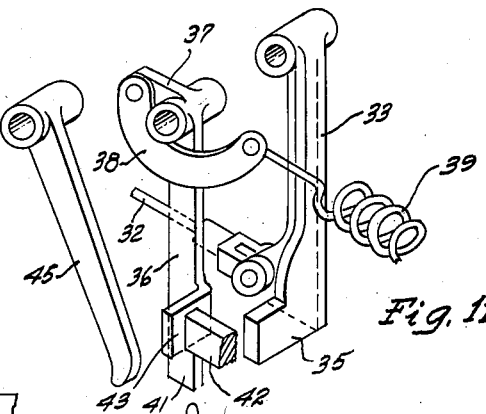
Fig. 11 is an exploded perspective view of the brake actuating levers.

A tractor 1 has the usual fifth wheel 2 pivotally mounted thereon, the fifth wheel having a slot 3 (Figs. 7 and 8) for the reception of a king pin 4 carried by the trailer 5. When the tractor and trailer are coupled, mechanism carried by the fifth wheel locks the king pin in the slot 3. This invention relates to the mounting means for the king pin and mechanisms associated therewith on the trailer for performing certain service operations, and the means for locking the king pin in the slot 3 has not been illustrated inasmuch as it forms no part of the invention.

Mounted upon the forward end of the trailer 5 are two parallel channel guides 6 receiving the rollers 7 which carry the king pin supporting block 8. The block 8 is movable forwardly and rearwardly of the trailer in its guides 6 and is adapted to be locked in its rearmost position against forward movement, and also in its forward position, or any stage between its rearmost position and its forward position, against rearward movement. The means for locking the block in its rearmost position, as shown in Figs. 1, 3, 5, and 7, comprises a U-shaped locking member 9 pivoted upon brackets 10 whereby it may be swung into engagement with a vertical stud 11 on the block 8. The U-shaped locking member 9 is so mounted that it falls by force of gravity into engagement with the stud 11, when the block 8 is in its rearmost position, to prevent forward movement of the block. The means for preventing rearward movement of the block comprises a pawl 12 pivoted between two bars 13, which are attached to the block 8 and extend rearwardly of the trailer, the pawl 12 being adapted to engage any one of a lengthwise extending series of ratchet teeth 14. The pawl 12 is mounted whereby it falls by force of gravity into engagement with the teeth 14.

Mounted in the block 8 is a rocking lever 15, one end of which extends beneath the locking member. The other end 16 of the rocking lever has a spring 17 connected thereto which acts thereon to rock said lever in a direction to elevate the locking member 9. A cam-like lever 16a extends under the rocking lever end 16 and when the tractor is coupled to the trailer, the fifth wheel 2 engages the cam-like lever 16a and causes it to rock the lever 15 to a position (see Fig. 7) permitting the locking member 9 to engage the stud 11, and thereby maintains the spring 17 compressed. The spring 17 is comparatively strong and exerts a normal pressure of approximately several hundred pounds. Therefore, when the fifth wheel moves away from the king pin, as it does in uncoupling, the cam-like lever 16a rides off the top surface of the fifth wheel and the rocking lever 15 moves very rapidly, as a result of the high spring pressure, from the position shown in Fig. 7 to that shown in Figs. 8 and 9. Such movement of the lever, snaps the locking member 9 out of engagement with the stud 11 and thereby releases the block 8 whereby it may move forwardly.

The rocking lever 15 also engages an arm 18 on the pawl 12 and maintains the pawl 12 elevated, with respect to the teeth 14, when the tractor and trailer are coupled as shown in Fig.

7. When the rocking lever 15 is moved, as shown in Figs. 6, 8 and 9, the arm 18 is released and the pawl 12 is permitted to fall into engagement with the teeth 14.

Adjacent to the forward end of the trailer is pivotally mounted a prop 19, adapted when lowered to support the forward end of the trailer, when the latter is uncoupled from the tractor. The forward and rearward movements of the king pin block 8, above described, are utilized to elevate and lower the prop 19. To this end, a cross shaft 20 is provided with rollers 21 on opposite ends thereof which are received in channel guides 22, and the shaft 20 is connected to the prop 19 by links 23. The parallel bars 13 are connected to a bar or bars 13a which is connected at 24 to a notched arm 25 pivoted upon the shaft 20. When the bar 13a is moved rearwardly it tips the arm 25 upwardly and pushes the shaft 20 and links 23 rearwardly to elevate the prop, as shown in Fig. 1. When prop lowers, the bar 13a moves forwardly, as shown in Fig. 2, and the arm 25 tips forwardly whereby it engages a rigid element 26, and thereby lowers and locks the prop in a lowered position.

The free wheels of the trailer are equipped, as usual, with brakes. One of the brakes 27, is shown in Fig. 2, and it will be understood that both brakes are connected, as by the link 28 and arm 29 to a rotatable shaft 30. A single arm 31 rigid on the shaft 30 is connected by a link 32 to an arm 33 which is rigidly mounted on a transversely extending rotatable shaft 34. The arm 33 has a laterally extending lug 35.

Loosely mounted on the shaft 34 is a lever 36 having an integral arm 37 with a curved link 38 connected thereto. To the free end of the link 38 is connected a tension spring 39 and the other end of the spring is connected by tension adjusting means 39a to a rigid transverse member 40. The spring 39 normally urges swinging movement of the lever 36 about the shaft 34 whereby its end 41 engages the laterally extending lug 35 and swings the arm 33, in a direction to apply the brakes. An extension 42 is provided on the locking member 25 which engages a lug 43 on the lever 36, when the block 8 is in or near its rearmost position, to swing the lever 36 in opposition to the pressure of the spring 39 whereby the usual brake shoe retracting springs (not shown) may release the brakes.

Adjacent and parallel to the shaft 34 is a rotatable shaft 44 having an arm 45 rigidly mounted thereon and adapted to engage the lug 43 on the lever 36. Externally of the trailer frame member 46 the shaft 44 carries a pawl 47 and a spring 48 acts upon the pawl to urge rotation of the pawl and shaft 44 and thereby maintains the arm 45 in contact with the lug 43. Also externally of the trailer frame 46 the shaft 34 is provided with a manually operable lever 49 having ratchet teeth 50 thereon.

Figure 12:
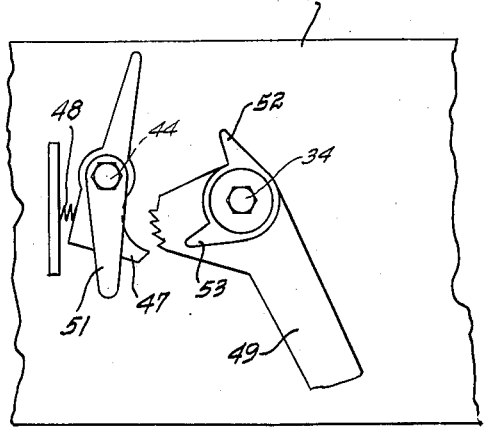
Figs. 12, 13 and 14 are elevations illustrating different positions of a detail.
Figure 13:
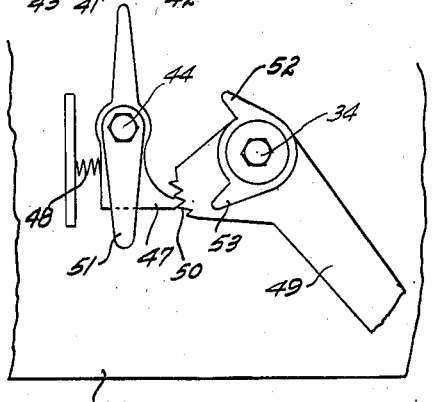

As shown in Fig. 12, the mechanism is positioned whereby the brakes are released, the lever 36 being held in its rearmost position by the extension 42, and the lug 43 holding the arm 45 in a position wherein the pawl 47 is spaced from the path of movement of the ratchet teeth 50. When the extension 42 is withdrawn from contact with the lug 43, the lever 36 is swung forwardly by the spring 39, and the spring 48 urges the pawl 47 to the position shown in Fig. 13, wherein it engages the ratchet teeth to hold the lever 36 against retrograde movement.

Figure 14:
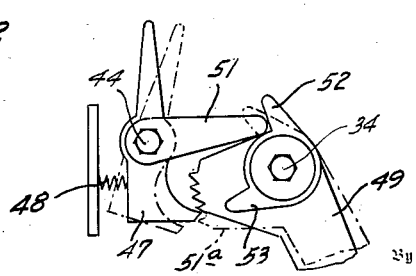

A dog 51 is pivoted concentric with the pawl 47 and is adapted to be manually moved into engagement with lugs 52 and 53 on the lever 49 to prevent rotation of the shaft 34. With the lever 49 positioned as shown in Fig. 14, the dog 51 may be placed in engagement with the lug 52 to hold the shaft 34 against movement in a direction causing brake application. In other words, the dog positioned as here indicated prevents application of the brakes. When positioned in engagement with the lug 53, as indicated in dot and dash lines in Fig. 14, the dog 51 holds the brakes applied.

As shown in Figs. 1, 3, 5 and 7, the tractor is coupled to the trailer, the king pin block 8 is in its rearmost position and is positively held in this position by the locking member 9. The extension 42 is in engagement with the lug 43 and the brakes are thereby held released. Assuming, for an understanding of the uncoupling operation, that the king pin holding means on the fifth wheel 2 is released to permit uncoupling, the tractor is moved. It will be noted that the pressure of the spring 39 and also the weight of the pivoted prop 19 are acting on the bar 13a in a manner to advance the king pin sliding block 8. Thus, when the tractor is moved and the fifth wheel 2 advances until the cam-like lever 16a registers with the slot 3, the lever 15 is actuated by the spring 17 to snap the locking member 9 from engagement with the stud 11, as shown in Fig. 8, so that the pressure of the spring 39 and the weight of the prop 19 initiate forward movement of the king pin block 8. The brakes are thus applied and the prop 19 lowered until it contacts the ground or assumes the position where it is fully lowered as shown in Fig. 2. The pawl 12, being released simultaneously with the lock 9, engages one of the teeth 14 to hold the block 8 and the prop 19 against retrograde movement. The pawl 12, it will be noted, holds the prop against retrograde movement whether the prop is fully lowered or not and it is possible, therefore to uncouple on irregular surfaces.

If, during uncoupling as above described, the friction is great enough to cause movement of the tractor with the trailer, the brakes may be manually applied by means of the lever 49.

Should the release of the locking member 9 fail to result from the pressure of the spring 17, a lever 60 is engaged by the fifth wheel 2 and is rocked to impart movement to the links 61 which are connected to arms 62 on the locking member 9. A spring 61a acts upon the links 61 to hold the lever 60 in its normal position. This movement positively initiates movement of the locking member and overcomes any friction which might prevent movement by the pressure of the spring.

With the tractor and trailer uncoupled, the forward end of the trailer is supported by the prop 19. As the tractor is again backed under the trailer, in the coupling operation, the fifth wheel strikes the cam-like lever 16a and the latter rocks the lever 15 whereby it engages the arm 18 and elevates the pawl 12. The locking member 9 is at this time riding on the bars 13 and the block 8 is free to move rearwardly. Continued movement of the tractor causes engagement of the end of the slot 3 with the king pin 4 and the block 8 is moved rearwardly, thereby causing the prop 19 to be elevated.

During the coupling operation the brakes are held applied by the pawl 47 until such time as the latter is released by operation of the arm 45, caused by swinging movement of the lever 36 when its lug 43 is engaged by the extension 42. At the time the pawl 47 is released, the stud 11 is positioned whereby the locking member 9 falls into locking engagement therewith.

The type of prop here shown is well known to the art, but in the instant case the locking pawl 12 cooperates in a novel manner therewith. As shown in Fig. 2 the locking member 25 is in a locked position and cannot be released without moving the element 13a rearwardly. The element 13a cannot move rearwardly at this time because the pawl 12 is operative to prevent rearward movement of the links 13. Therefore the pawl 12 comprises a lock for locking the lock 25 in a locked position. This function is important inasmuch as during coupling of the tractor to the trailer the locking member 25 is held locked until the fifth wheel engages the cam-like lever 16a and through rocking the rocking lever 15 raises the pawl 12. The coupling operation is almost completed, therefore, before the king pin block is moved to elevate the prop and the brakes will remain applied until coupling has been completed.

As a result of the locking function referred to immediately above it is impossible to elevate the prop unless the king pin enters the slot in the fifth wheel. If the king pin rides on top of the fifth wheel the cam-like lever 16a cannot be actuated and the king pin remains locked against movement relative to its guides.

Although a specific embodiment of the invention has been illustrated and described it will be understood that various changes may be made within the scope of the appended claims without departing from the spirit of the invention and such changes are contemplated.

What I claim is:

1. In combination with a trailer adapted to have a tractor coupled thereto, brakes on said trailer, yieldable means normally acting on said brakes for applying the same, releasable means for positively holding the brakes applied, and manual means for rendering said yieldable means ineffective and for releasing said releasable means.

2. In combination with a trailer adapted to have a tractor coupled thereto, brakes on said trailer, yieldable means normally acting on said brakes for applying the same, releasable means for positively holding the brakes applied, manual means for rendering said yieldable means ineffective and for releasing said releasable means, and means operable independently of said releasable means and said last-named means for positively holding said yieldable means ineffective.

3. In a trailer having a prop movable between raised and lowered position and having brakes, means acting to apply the brakes, means for overcoming said first-named means and operable in accordance with movement of the prop, and manually operable means for rendering said second-named means ineffective and for releasing said first-named means.

4. In a trailer having a prop movable between raised and lowered positions and having brakes, means acting to apply the brakes, means operable to restrain said brake applying means and operable to release said brake applying means upon lowering of the prop, and releasable means for positively holding the brakes applied and actuated by said second-named means.

5. In a trailer having brakes and having a prop arranged to be raised and lowered, a lever operatively connected to the brakes, a second lever operatively connected to said first-named lever, means operable in accordance with movement of the prop and operatively connected to said second-named lever, and means for positively holding the brakes applied and operatively connected to said first-named means.

6. In a trailer having brakes and having a prop arranged to be raised and lowered, a lever operatively connected to the brakes, a second lever operatively connected to said first-named lever, means operable in accordance with movement of the prop and operatively connected to said second-named lever, means for positively holding the brakes applied and operatively connected to said first-named means, and manually operable means for releasing said brake holding means.

7. In a trailer having brakes and having a prop arranged to be raised and lowered, a lever operatively connected to the brakes, a second lever operatively connected with said first-named lever, spring means acting on said second-named lever to pivot said first-named lever to apply the brakes, means operable in accordance with movement of the prop and operable to overcome said spring means, a third lever operatively connected with said second-named lever, and a holding device operable for positively holding the brakes applied and operatively connected to said third-named lever.

8. In a trailer having brakes and having a prop arranged to be raised and lowered, a lever operatively connected to the brakes, a second lever operatively connected with said first-named lever, spring means acting on said second-named lever to pivot said first-named lever to apply the brakes, means operable in accordance with movement of the prop and operable to overcome said spring means, a third lever operatively connected with said second-named lever, a holding device operable for positively holding the brakes applied and operatively connected to said third-named lever, and manually operable means for releasing said holding means.

9. In a trailer having brakes, a prop for the trailer and movable between lowered and raised positions, means acting to apply the brakes, releasable means for positively holding the brakes applied and controlled by said first-named means, means operable in accordance with raising and lowering of said prop to control operation of said brake applying means, and means for rendering said first-named means ineffective and for releasing said releasable means.

10. In a trailer having brakes, a prop for the trailer and movable between lowered and raised positions, means operable to apply the brakes, control means operable in accordance with raising and lowering of said prop to control operation of said brake applying means, safety holding means actuated by said control means for releasably holding the brakes applied, and manually operable means for controlling operation of said brake applying means independently of said control means.

SIDNEY B. WINN.